J. WERNER.
CREAM BREAKER AND MELTER.
APPLICATION FILED NOV. 30, 1907.

915,139.

Patented Mar. 16, 1909.

WITNESSES:

INVENTOR:

UNITED STATES PATENT OFFICE.

JOHN WERNER, OF ROCHESTER, NEW YORK.

CREAM BREAKER AND MELTER.

No. 915,139.

Specification of Letters Patent. Patented March 16, 1909.

Application filed November 30, 1907. Serial No. 404,633.

*To all whom it may concern:*

Be it known that I, JOHN WERNER, a citizen of the United States, and resident of Rochester, in the county of Monroe and State of New York, have invented certain new and useful Improvements in Cream Breakers and Melters, of which the following is a specification.

This invention relates to cream breakers and melters, and consists in the construction and arrangement of the apparatus herein described and claimed.

The object of the invention is to provide an efficient apparatus for the purposes hereinafter set forth.

Figure 1:
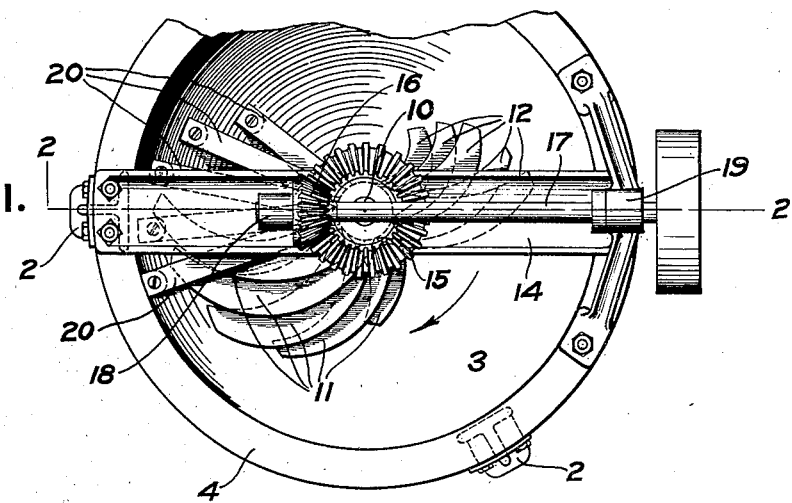
Figure 2:
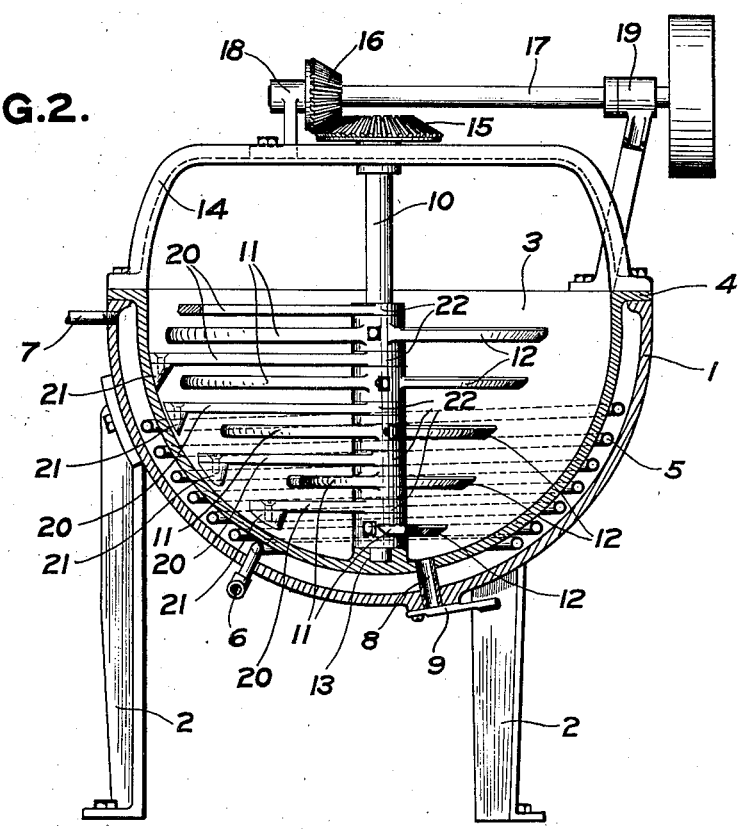

In the drawings: Figure 1 is a top plan view; and Fig. 2 is a section on the line 2—2 of Fig. 1.

The melter has an outer kettle 1, hemispherical in shape, and supported at a suitable height from the floor on legs 2. A smaller hemispherical kettle 3 rests within the kettle 1, and is bolted thereto through a flange 4. Packing is placed in the joint to make it steam-tight. In the space between the kettles 1 and 3 is a pipe coil 5. Steam is admitted to said coil at 6, and escapes from its upper end, condensing more or less rapidly upon the outer surface of the kettle 3, and the inner surface of the kettle 1. When the water thus formed rises to the top of the kettles, it may overflow through a pipe 7. This construction is therefore a jacketed kettle. The steam in the coil 5 maintains the water at its own temperature, and the cream candy placed in the inner kettle is melted by contact with the sides thereof. The melted cream may be drawn off through a pipe 8, located near the center of the bottom of the kettles, and closed at its outer end by a valve 9, such as a "molasses-gate".

The mechanism for breaking up large pieces of hardened or unmelted cream comprises a vertical shaft 10 in the center of the inner kettle 3, on which is fixed a series of collars, each having oppositely extending horizontal blades 11 and 12. The shaft 10 is revolubly supported in a bearing 13 at the bottom, and in a bearing in a frame 14 at the top. On its upper end is a bevel-gear 15, adapted to mesh with a gear 16. The gear 16 is fixed to a horizontal driven shaft 17, supported above the frame 14 in bearings 18 and 19, and usually carrying a driving pulley as shown.

The shaft 10 is rotated in the direction indicated by the arrow in Fig. 1. The blades 11 are so formed that they present a concave operating edge toward the direction of rotation, and the blades 12 are so formed that they present a convex operating edge thereto. The collars are set upon the shaft 10 in such a position that each pair of the blades 11 and 12 is slightly in advance of the pair beneath, (Fig. 1), and thus they may be called "spirally-stepped". The front edge of each blade, which is toward the direction of rotation, is beveled downward and backward from the top (see the blades 12, Fig. 2), so that as it comes in contact with the lumps of cream, the latter are not only broken up, but are also wedged downwardly toward the bottom of the kettle 3. To insure a finer division of the lumps of cream, a series of stops or abutments is placed in the kettle 3, and the blades 11 and 12 pass between the stops once during each revolution of the shaft 10, thus being cleared of large pieces which may adhere to them, and dividing said pieces into finer particles. The stops or abutments in the present instance are flat bars 20, each of which lies in a horizontal plane between the paths of rotation of two of the pairs of blades 11 and 12. The outer ends of the bars 20 are bolted to suitable lugs 21 on the inside of the kettle 3, and the inner ends are formed as collars 22, which lie between the collars, and fit loosely around the shaft 10. The bars 20 are not in alinement vertically, but each is somewhat in advance of the one next above it (Fig. 1). Said bars are thus relatively advanced or spirally stepped in a direction opposite to that of the blades 11 and 12. No more than one of said blades, therefore, can pass between two of the bars 20 at the same time; one blade is completely clear of the two bars between which it passes when the next blade beneath it approaches the bars lying adjacent to its plane of rotation. This spiral arrangement prevents the excessive strain on the driving mechanism which would occur if all the bars 20 and blades 11 and 12 were to pass each other at the same instant. The lumps of cream are thus broken up into comparatively small sizes, without requiring any great amount of power to operate the machine, and without undue strain upon any part. The effect of the concave knives 11 is to tend to move the lumps of cream inward toward the center of the kettle, and the convex knives 12 tend to move the lumps outward, so that the lumps receive thorough treatment, and the mass is thoroughly mixed.

What I claim is:—

1. The combination of a melting kettle, a rotary shaft therein having oppositely directed spirally-stepped blades thereon, and a series of stationary stops coöperating with the whole length of the respective blades and between which the blades pass and which are spirally-stepped oppositely to the blades.

2. The combination of a melting kettle, a rotary shaft therein having two oppositely directed series of spirally-stepped blades thereon, one series having concave operating edges and the other series having convex operating edges, and a series of spirally-stepped stationary stops between which the blades pass.

3. The combination of a melting kettle, a rotary shaft therein having two oppositely directed series of spirally-stepped blades thereon, one series having concave operating edges and the other series having convex operating edges, and a series of stationary stops between which the blades pass and which are spirally-stepped oppositely to the blades.

4. The combination of a melting kettle, a rotary shaft therein having two series of spirally-arranged and oppositely directed blades thereon, each pair of blades being slightly in advance of the next pair, and a series of spirally-arranged stationary stops between which the blades pass and in which each stop is in advance of the next one.

5. The combination of a melting kettle, a rotary shaft therein having two series of spirally-arranged and oppositely directed blades thereon, each pair of blades being slightly in advance of the next pair, one series having concave operating edges and the other series having convex operating edges, and a series of spirally-arranged stationary stops between which the blades pass and in which each stop is in advance of the next one.

6. The combination of a melting kettle, a rotary shaft therein having two oppositely directed series of spirally-arranged blades thereon, one series having concave operating edges and the other series having convex operating edges, and a series of stationary stops between which the blades pass.

7. The combination of a melting kettle, a rotary shaft therein having two oppositely directed series of spirally-arranged blades thereon, one series having concave operating edges and the other series having convex operating edges, and a series of stationary stepped stops between which the blades pass.

8. The combination of a melting kettle, a rotary shaft therein having two oppositely directed series of spirally-stepped blades thereon, one series being long and having concave operating edges and the other series being short and having convex operating edges, collars on the shaft, and a series of stops between which the blades pass extending from the collars to the periphery of the kettle.

9. The combination of a melting kettle, a rotary shaft therein having two oppositely directed series of spirally-stepped blades thereon, one series being long and having concave operating edges and the other series being short and having convex operating edges, and a series of stops between which the blades pass extending from the shaft to the periphery of the kettle.

10. The combination of a melting kettle, a rotary shaft therein having two oppositely directed series of spirally-stepped blades thereon, one series being long and having concave operating edges and the other series being short and having convex operating edges, collars on the shaft, and a series of spirally-arranged stops between which the blades pass extending from the collars to the periphery of the kettle.

11. The combination of a melting kettle, a rotary shaft therein having two oppositely directed series of spirally-stepped blades thereon, one series being long and having concave operating edges and the other series being short and having convex operating edges, and a series of spirally-arranged stops between which the blades pass extending from the shaft to the periphery of the kettle.

JOHN WERNER.

Witnesses:
D. GURNEE,
L. THON.